(12) United States Patent
Lindsey et al.

(10) Patent No.: US 9,037,490 B2
(45) Date of Patent: May 19, 2015

(54) TWO PHASE PAYMENT LINK AND AUTHORIZATION FOR MOBILE DEVICES

(71) Applicant: Toshiba Global Commerce Solutions Holdings Corporation, Tokyo (JP)

(72) Inventors: Paul D. Lindsey, Springdale, AR (US); Eric J. Nilsen, Rogers, AR (US); Mark W. Sisson, Fayetteville, AR (US)

(73) Assignee: Toshiba Global Commerce Solutions Holdings Coporation, Tokyo (JP)

( * ) Notice: Subject to any disclaimer, the term of this patent is extended or adjusted under 35 U.S.C. 154(b) by 58 days.

(21) Appl. No.: 14/034,904

(22) Filed: Sep. 24, 2013

(65) Prior Publication Data

US 2014/0019277 A1    Jan. 16, 2014

Related U.S. Application Data

(63) Continuation of application No. 12/831,451, filed on Jul. 7, 2010, now Pat. No. 8,571,939.

(51) Int. Cl.
*G06Q 20/20*     (2012.01)
*G06Q 20/32*     (2012.01)
*G06Q 20/38*     (2012.01)
(Continued)

(52) U.S. Cl.
CPC .............. *G06Q 20/322* (2013.01); *G06Q 20/20* (2013.01); *G06Q 20/204* (2013.01); *G06Q 20/32* (2013.01); *G06Q 20/3274* (2013.01); *G06Q 20/385* (2013.01); *G06Q 20/425* (2013.01)

(58) Field of Classification Search
USPC .................... 705/17, 21, 35, 39, 64; 235/375; 455/414.1, 566
See application file for complete search history.

(56) References Cited

U.S. PATENT DOCUMENTS 7,273,168 B2    9/2007   Linlor
7,584,886 B2    9/2009   Labaton
(Continued)

FOREIGN PATENT DOCUMENTS

WO    2005081512 A1    9/2005
WO    2009070114 A1    6/2009

OTHER PUBLICATIONS

Claude Berthon, PCT Notification of Transmittal of the International Search Report and the Written Opinion of the International Searching Authority, or the Declaration, Date of Mailing Sep. 30, 2011, 9 pages.
(Continued)

*Primary Examiner* — Seye Iwarere
*Assistant Examiner* — Reva R Danzig
(74) *Attorney, Agent, or Firm* — Hoffman Warnick LLC

(57) ABSTRACT

Aspects of the invention are directed to a two phase payment link and authorization method and system for mobile devices. A method for payment and authorization according to an embodiment includes: requesting and receiving, at a mobile device, a transaction identifier from a payment service; displaying the transaction identifier on a display of the mobile device, wherein the transaction identifier is in a machine readable format; scanning the transaction identifier at a point of sale system; sending the transaction identifier and transaction information associated with items to be purchased from the point of sale system to the payment service; creating, at the payment service, a logical link between the mobile device and the point of sale system, based on the transaction identifier; and sending the transaction information from the payment system to the mobile device.

19 Claims, 3 Drawing Sheets

(51) Int. Cl.
*G06Q 20/42* (2012.01)
*G06Q 40/00* (2012.01)
*G06Q 40/06* (2012.01)
*G06Q 40/04* (2012.01)
*G06Q 20/04* (2012.01)
*G06Q 20/40* (2012.01)

(56) References Cited

U.S. PATENT DOCUMENTS

| | | |
|---|---|---|
| 2001/0051915 A1 | 12/2001 | Ueno et al. |
| 2006/0253389 A1* | 11/2006 | Hagale et al. .................. 705/39 |
| 2008/0011825 A1 | 1/2008 | Giordano et al. |
| 2008/0091616 A1 | 4/2008 | Helwin et al. |
| 2008/0195536 A1 | 8/2008 | Karns et al. |
| 2009/0037285 A1 | 2/2009 | Murphy |
| 2009/0084840 A1 | 4/2009 | Williams et al. |
| 2009/0094125 A1 | 4/2009 | Killian et al. |
| 2009/0144161 A1 | 6/2009 | Fisher |
| 2009/0204530 A1 | 8/2009 | Hanson |
| 2009/0254440 A1 | 10/2009 | Pharris |
| 2009/0281904 A1* | 11/2009 | Pharris .......................... 705/17 |
| 2009/0307140 A1 | 12/2009 | Mardikar |
| 2010/0082485 A1 | 4/2010 | Lin et al. |
| 2011/0039585 A1 | 2/2011 | Rouse et al. |
| 2011/0055317 A1 | 3/2011 | Vonog et al. |
| 2011/0264571 A1 | 10/2011 | Hadar et al. |

OTHER PUBLICATIONS

U.S. Appl. No. 12/831,451, Office Action dated Jun. 8, 2012.
U.S. Appl. No. 12/831,451, Office Action dated Feb. 28, 2013.
U.S. Appl. No. 12/831,451, Notice of Allowance and Fees Due dated Jun. 21, 2013.
Valcourt et al, "Investigating mobile payment: supporting technologies, methods, and use", Copyright IEEE 2005.

* cited by examiner

TWO PHASE PAYMENT LINK AND AUTHORIZATION FOR MOBILE DEVICES

CROSS-REFERENCE TO RELATED APPLICATION

This application is a continuation application of, and claims priority to, U.S. application Ser. No. 12/831,451, which is hereby incorporated by reference in its entirety.

TECHNICAL FIELD

The disclosure relates generally to point of sale payments, and more particularly, to a two phase payment link and authorization method and system for mobile devices.

BACKGROUND

Payment by a mobile device, such as a mobile phone, personal digital assistant (PDA), and/or the like, is an emerging trend in the retail customer shopping experience. Customers want the ability to use their mobile device as a payment method for retail transactions at a physical point of sale system. Current technologies used to facilitate the interaction of a mobile device with a physical point of sale system include near field communication (NFC) and radio frequency identification (RFID). These current approaches, however, require specific hardware technology to be present in the mobile device and the physical point of sale system. Unfortunatetly, NFC and RFID technologies are available in only a limited number of mobile devices.

SUMMARY

Aspects of the invention are directed to a two phase payment link and authorization method and system for mobile devices.

A first aspect of the invention provides a method for payment and authorization, comprising: requesting and receiving, at a mobile device, a transaction identifier from a payment service; displaying the transaction identifier on a display of the mobile device, wherein the transaction identifier is in a machine readable format; scanning the transaction identifier at a point of sale system; sending the transaction identifier and transaction information associated with items to be purchased from the point of sale system to the payment service; creating, at the payment service, a logical link between the mobile device and the point of sale system, based on the transaction identifier; and sending the transaction information from the payment system to the mobile device.

A second aspect of the invention provides an apparatus for payment and authorization, comprising: a component for requesting and receiving, at a mobile device, a transaction identifier from a payment service; a display for displaying the transaction identifier on the mobile device, wherein the transaction identifier is in a machine readable format; a component for scanning the transaction identifier at a point of sale system; a component for sending the transaction identifier and transaction information associated with items to be purchased from the point of sale system to the payment service; a component for creating, at the payment service, a logical link between the mobile device and the point of sale system, based on the transaction identifier; and a component for sending the transaction information from the payment system to the mobile device.

A third aspect of the invention provides a computer program comprising program code embodied in at least one computer-readable storage medium, which when executed, enables a computer system to implement a method for payment and authorization, the method comprising: requesting and receiving, at a mobile device, a transaction identifier from a payment service; displaying the transaction identifier on a display of the mobile device, wherein the transaction identifier is in a machine readable format; scanning the transaction identifier at a point of sale system; sending the transaction identifier and transaction information associated with items to be purchased from the point of sale system to the payment service; creating, at the payment service, a logical link between the mobile device and the point of sale system, based on the transaction identifier; and sending the transaction information from the payment system to the mobile device.

A fourth aspect of the invention provides a method of generating a computer system for payment and authorization, the method comprising: providing a computer system operable to: request and receive, at a mobile device, a transaction identifier from a payment service; display the transaction identifier on a display of the mobile device, wherein the transaction identifier is in a machine readable format; scan the transaction identifier at a point of sale system; send the transaction identifier and transaction information associated with items to be purchased from the point of sale system to the payment service; create, at the payment service, a logical link between the mobile device and the point of sale system, based on the transaction identifier; and send the transaction information from the payment system to the mobile device.

A fifth aspect of the invention provides a method for payment and authorization, comprising: requesting and receiving, at a mobile device, a transaction identifier from a payment service; displaying the transaction identifier on a display of the mobile device, wherein the transaction identifier is in a machine readable format; scanning the transaction identifier at a point of sale system; sending the transaction identifier and transaction information associated with items to be purchased from the point of sale system to the payment service; creating, at the payment service, a logical link between the mobile device and the point of sale system, based on the transaction identifier; sending the transaction information from the payment system to the mobile device; and authenticating, at the payment service, an identity of a user of the mobile device, the authenticating including entering and storing identity information of the user at the payment service, wherein the authenticating further includes providing the stored identity information of the user after initiating the payment authorization, wherein the entering and storing of the identity information is performed prior to the initiating of the payment authorization.

A sixth aspect of the invention provides an apparatus for payment and authorization, comprising: a component for requesting and receiving, at a mobile device, a transaction identifier from a payment service; a display for displaying the transaction identifier on the mobile device, wherein the transaction identifier is in a machine readable format; a component for scanning the transaction identifier at a point of sale system; a component for sending the transaction identifier and transaction information associated with items to be purchased from the point of sale system to the payment service; a component for creating, at the payment service, a logical link between the mobile device and the point of sale system, based on the transaction identifier; a component for sending the transaction information from the payment system to the mobile device; and a component for authenticating, at the payment service, an identity of a user of the mobile device, the authenticating including entering and storing identity information of the user at the payment service, wherein the component for authenticating further provides the stored identity information of the user after initiating the payment authorization, wherein the entering and storing of the identity information is performed prior to the initiating of the payment authorization.

A seventh aspect of the invention provides a computer program comprising program code embodied in at least one computer-readable storage medium, which when executed, enables a computer system to implement a method for payment and authorization, the method comprising: requesting and receiving, at a mobile device, a transaction identifier from a payment service; displaying the transaction identifier on a display of the mobile device, wherein the transaction identifier is in a machine readable format; scanning the transaction identifier at a point of sale system; sending the transaction identifier and transaction information associated with items to be purchased from the point of sale system to the payment service; creating, at the payment service, a logical link between the mobile device and the point of sale system, based on the transaction identifier; sending the transaction information from the payment system to the mobile device; and authenticating, at the payment service, an identity of a user of the mobile device, the authenticating including entering and storing identity information of the user at the payment service, wherein the authenticating further includes providing the stored identity information of the user after initiating the payment authorization, wherein the entering and storing of the identity information is performed prior to the initiating of the payment authorization.

An eight aspect of the invention provides a method of generating a computer system for payment and authorization, the method comprising: providing a computer system operable to: request and receive, at a mobile device, a transaction identifier from a payment service; display the transaction identifier on a display of the mobile device, wherein the transaction identifier is in a machine readable format; scan the transaction identifier at a point of sale system; send the transaction identifier and transaction information associated with items to be purchased from the point of sale system to the payment service; create, at the payment service, a logical link between the mobile device and the point of sale system, based on the transaction identifier; send the transaction information from the payment system to the mobile device; and authenticating, at the payment service, an identity of a user of the mobile device, the authenticating including entering and storing identity information of the user at the payment service, wherein the authenticating further includes providing the stored identity information of the user after initiating the payment authorization, wherein the entering and storing of the identity information is performed prior to the initiating of the payment authorization.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention are directed to a two phase payment link and authorization method and system for mobile devices. As used herein, unless otherwise noted, the term "set" means one or more (i.e., at least one) and the phrase "any solution" means any now known or later developed solution.

The mobile device market is rapidly moving towards application-based devices. Major mobile device manufacturers have introduced the ability to develop and distribute custom applications through consumer accessible application stores. Application-based mobile devices provide the opportunity to create a pervasive software-based solution for mobile device payment at the physical point of sale without additional and/or unique hardware requirements (on either the mobile device or the point of sale system).

The two phase payment link and authorization method and system for mobile devices described below leverages cloud-based technology to facilitate the interaction of mobile devices with physical point of sale systems. The two phase payment link and authorization of the present invention involves running a mobile payment application on a mobile device which connects to a payment cloud and retrieves a unique time-limited transaction identifier. This unique transaction identifier is presented to the physical point of sale system using the display of the mobile device. The physical point of sale system scans or otherwise acquires the unique transaction identifier and sends the unique transaction identifier to the payment cloud. Based on the unique transaction identifier, the payment cloud creates a logical link between the mobile device and the physical point of sale system through which transaction detail, payment method, and authorization information can be exchanged to complete a transaction.

Figure 1:
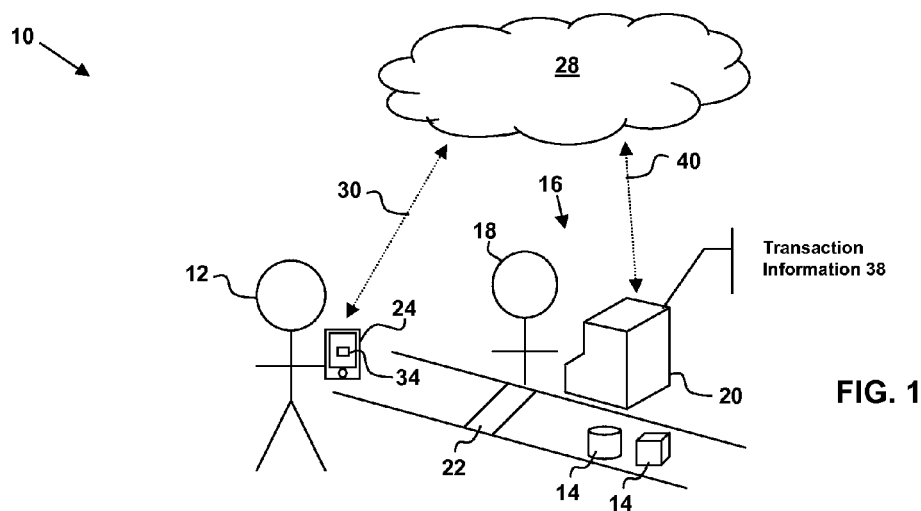
FIG. 1 depicts an illustrative two phase payment link and authorization system in accordance with an embodiment

A two phase payment link and authorization system 10 in accordance with an embodiment is depicted in FIG. 1. In this example, a customer 12 is purchasing at least one item 14 at a point of sale system 16. The point of sale system 16 may be operated by a sales associate 18 or may be a self-serve point of sale system operated by the customer 10. The point of sale system 16 includes a cash register 20 and an optical scanning device 22 capable of reading (e.g., scanning) a barcode or other machine-readable representation of data. The cash register 20 may include components such as a credit card reader, a receipt printer, a cash drawer, a pin pad, a signature capture pad, and/or the like.

Figure 2:
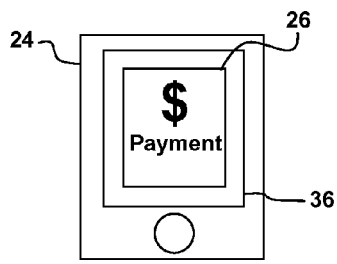
FIGS. 2-6 depict various views of a mobile payment application running on a mobile device according to an embodiment.

Referring to FIG. 1 and FIG. 2, a mobile device 24 used by the customer 12 is configured to run a mobile payment application 26. The mobile payment application 26 is actuated by the customer 12 to initiate a payment process for the items 14 at the point of sale system 16. The mobile payment application 26 may be tailored such that it can be used only with a specific retailer (e.g., IBM Payment Application), or may be configured for use with a plurality of different retailers, similar to a generic credit or debit card.

The mobile payment application 26 is configured to connect the mobile device 24 to a payment service, such as payment cloud 28. The connection 30 between the mobile device 24 and the payment cloud 28 can be established via any suitable now known or later developed wired networking, wireless networking, or mobile telecommunications technology capable of accessing the Internet. This may include, for example, a local area network (LAN), a wireless local area network (WLAN) based on the IEEE 802.11 standards, a cellular network (e.g., UMTS or CDMA2000), etc.

The payment cloud 28 comprises computing, software, storage, and network (e.g., Internet) resources hosting business software services. The resources of the payment cloud 28 are provided to the mobile device 24 and other devices on-demand. The software services of the payment cloud 28 include, for example, capabilities such as establishing and maintaining a logical link between the point of sale system 16 and the mobile device 24 of the customer 12, based on a unique transaction identifier (detailed below), routing transaction information between linked devices, and providing access to enterprise services such as payment authorization. The payment cloud can be implemented using any cloud computing model, including public, private, and hybrid platforms. For example, a public payment cloud could be a hosted service offered by a third party. The private payment cloud could be hosted internally by a single enterprise. Additionally, the hybrid payment cloud could segment the software services of the payment cloud 28 between a hosted public payment and an internal private payment cloud depending on the business scenario.

Figure 3:
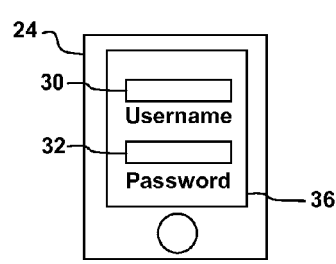
Figure 4:
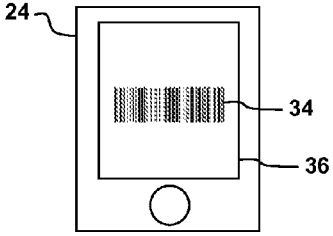

After launching the mobile payment application 26 on the mobile device 24, the customer 12 is prompted to confirm their identity. For example, as depicted in FIG. 3, this may include the customer 12 entering a username 30 and password 32 that is verified by the payment cloud 28. After authentication, the payment cloud 28 returns a unique transaction identifier 34 to the mobile device 24 over the connection 30. As depicted in FIG. 4, the unique transaction identifier 34 is presented by the mobile payment application 26 on the display 36 of the mobile device 24 in a machine readable (e.g., optically scannable) format (e.g., a barcode).

The customer 12 subsequently presents the mobile device 24 displaying the unique transaction identifier 34 to the sales associate 18, or to a self-service scanning device, at the point of sale system 16. This may be done before or after the prices of the items 14 to be purchased have been entered into and totaled by the cash register 20 to generate transaction information 38. The prices can, for example, be entered manually or by scanning the universal product codes (UPCs) on the items 14 to be purchased using the optical scanning device 22.

Using the optical scanning device 22, the sales associate 18 (or the customer 12) scans the unique transaction identifier 34 displayed on the display 36 of the mobile device 24. The point of sale system 16 then sends the transaction information 38 and the unique transaction identifier 34 to the payment cloud 38 via a connection 40. Similar to the connection 30, the connection 40 between the point of sale system 16 and the payment cloud 28 can be established via any suitable now known or later developed wired networking, wireless networking, or mobile telecommunications technology capable of accessing the Internet.

Figure 5:
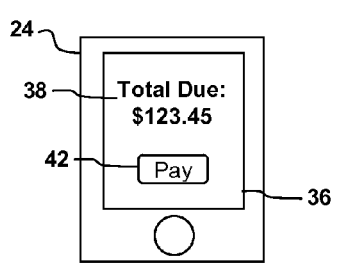

Upon receipt of the transaction information 38 and the unique transaction identifier 34, the payment cloud 28 associates and creates a logical link between the point of sale system 16 and the mobile device 24 of the customer 12, based on the unique transaction identifier 34. The payment cloud 28 then sends the transaction information 38 to the mobile payment application 26 on the mobile device 24 of the customer 12 over the communication link 30. As depicted in FIG. 5, the mobile payment application 26 displays the transaction information 38 to the customer 12.

Figure 6:
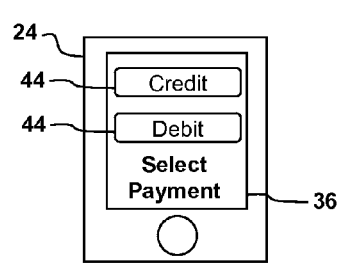

After receiving and reviewing the transaction information 38, and actuating a pay command (e.g., by selecting pay button 42 (FIG. 5)), the customer 12 chooses a payment method. For instance, as shown in FIG. 6, the mobile payment application 26 may present several payment choices 44 to the customer 12 including, for example: credit card, debit card, etc. After the customer 12 selects a payment method, and enters any required authorization information for the chosen payment method (if necessary), the mobile payment application 26 running on the mobile device 24 sends an indicator of the selected payment method to the payment cloud 28 over the connection 30. The payment cloud 28 completes the payment authorization using the selected payment method, and sends an acknowledgement to the point of sale system 16 via the connection 40. The point of sale system 16 records the payment authorization with the transaction information 38 and prints a customer receipt including the transaction information 38 and the payment authorization details. Alternatively, or additionally, the payment cloud 28 can send an electronic customer receipt including the transaction information and the payment authorization details to the mobile payment application 26 via the connection 30. The mobile payment application 26 is configured to display the electronic customer receipt to the customer 12. The payment cloud 28 can also send an electronic customer receipt to the customer 12 via an email or in any other suitable manner.

Identity confirmation may also occur at a later stage in the process. For instance, identity information of the customer 12 can be entered and stored into the mobile payment application 26. In this case, the customer 12 remains anonymous to the payment cloud 28 until the payment process is initiated, at which time the stored identity information of the customer 12 and any other required payment authorization information is provided to the payment cloud 28.

The unique transaction identifier 34 may be time-limited. For instance, the unique transaction identifier 34 may expire and no longer be valid if a predetermined period of time (e.g., 30 to 120 seconds) elapses before the unique transaction identifier 34 is scanned into the point of sale system 16 or if a predetermined period of time (e.g., 30 to 120 seconds) elapses between communications to/from the mobile device 24, point of sale system, 16, and/or payment cloud 28.

Although described above with regard to the purchase of items at a retail store, it should be noted that the two phase payment link and authorization of the present invention can be used to pay for any type of goods or services at any point of sale system. For example, a customer can use the two phase payment link and authorization of the present invention to pay for a meal at a restaurant, to purchase gasoline at a gas station, to purchase tickets at a concert or sporting event, etc.

Figure 7:
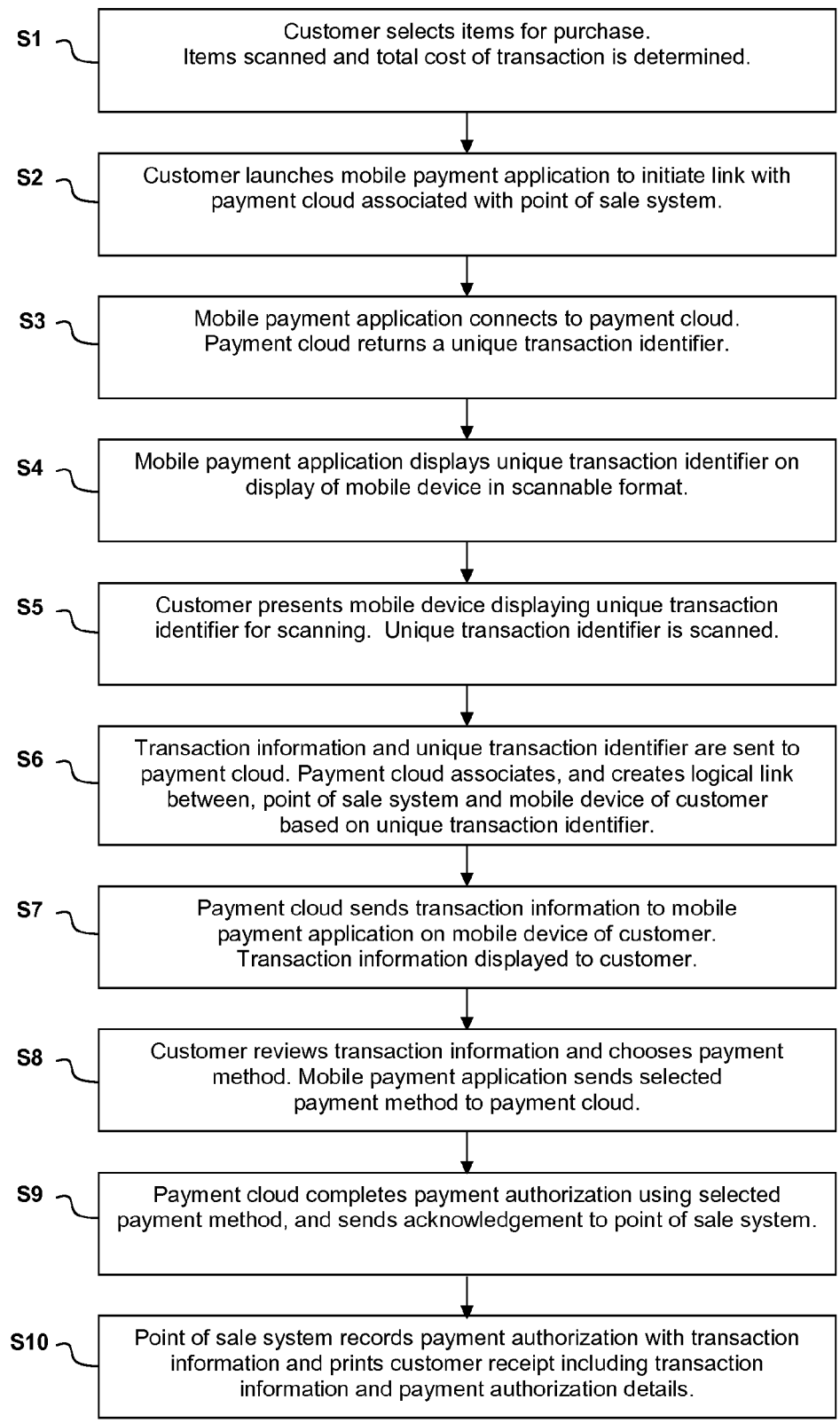
FIG. 7 depicts a flow diagram of an illustrative process according to an embodiment.

FIG. 7 depicts a flow diagram of an illustrative process according to an embodiment.

At S1, the customer selects at least one item for purchase at a point of sale system. A sales associate or the customer scans the items and obtains a total cost of the transaction. At S2, the customer launches the mobile payment application on a mobile device to initiate a link with a payment cloud associated with the point of sale system. This may include a customer authentication process to ensure that the customer is authorized to access the payment cloud.

At S3, the mobile payment application connects to the payment cloud, which returns a unique transaction identifier. At S4, the mobile payment application displays the unique transaction identifier on a display of the mobile device in a machine-readable (e.g., scannable) format.

At S5, the customer presents the mobile device displaying the unique transaction identifier to the sales associate or to a self-service scanning device, at the point of sale system, and the unique transaction identifier is scanned. At S6, the transaction information and the unique transaction identifier are sent to the payment cloud, which associates and creates a logical link between the point of sale system and the mobile device of the customer based on the unique transaction identifier.

At S7, the payment cloud sends the transaction information to the mobile payment application on the mobile device of the customer, which displays the transaction information to the customer. At S8, the customer reviews the transaction information and chooses a payment method, and the mobile payment application sends an indicator of the selected payment method to the payment cloud.

At S9, the payment cloud completes the payment authorization using the selected payment method, and sends an acknowledgement to the point of sale system. At S10, the point of sale system records the payment authorization with the transaction information and prints a customer receipt including the transaction information and the payment authorization details.

Figure 8:
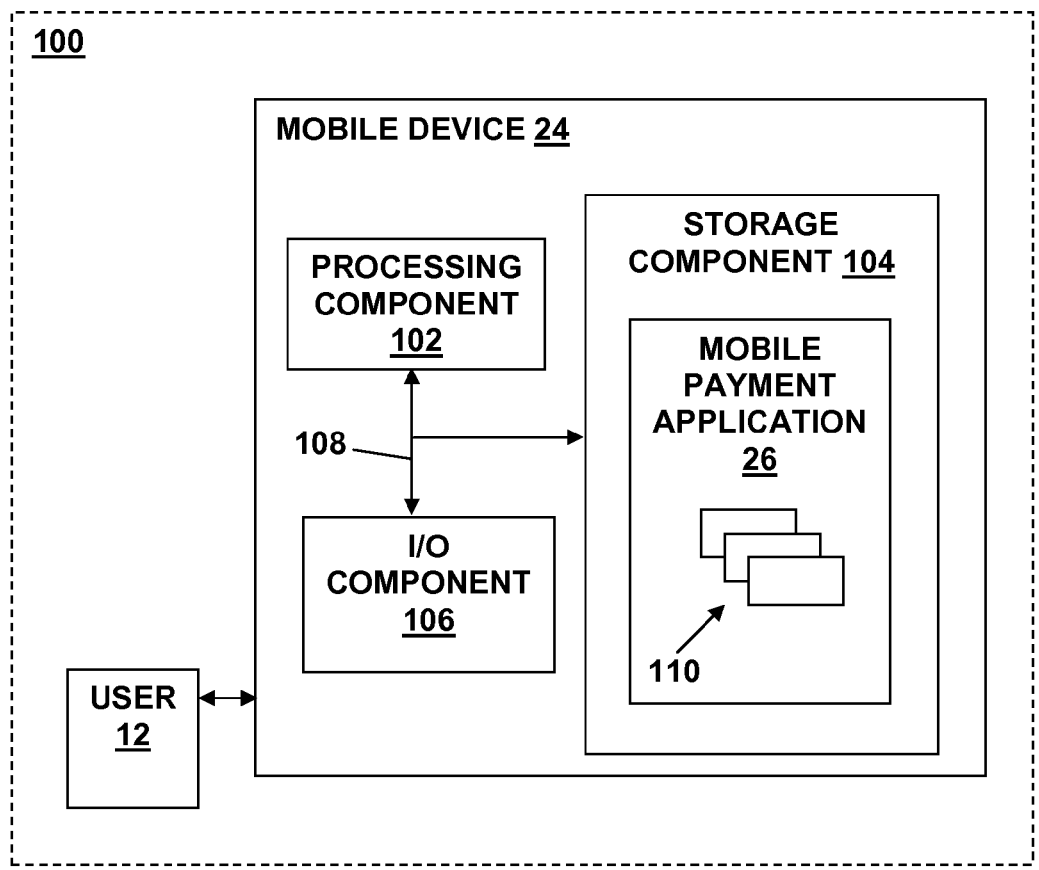
FIG. 8 depicts an illustrative environment for implementing a two phase payment link and authorization according to an embodiment.

FIG. 8 shows an illustrative environment 100 for implementing a two phase payment link and authorization according to an embodiment. To this extent, the environment 100 includes a mobile device 24 running a mobile payment application 26 that can perform various processes described herein.

The mobile device 24 is shown including a processing component 102 (e.g., one or more processors), a storage component 104 (e.g., a storage hierarchy), an input/output (I/O) component 106 (e.g., one or more I/O interfaces and/or devices (e.g., keyboard, mouse, display, etc.), and a communications pathway 108. In general, the processing component 102 executes program code, such as the mobile payment application 26, which is at least partially fixed in the storage component 104. While executing program code, the processing component 102 can process data, which can result in reading and/or writing transformed data from/to the storage component 104 and/or I/O component 106 for further processing. The pathway 108 provides a communications link between each of the components in the mobile device 24. The I/O component 106 can comprise one or more human I/O devices, which enable a user (e.g., customer 12) to interact with the mobile device 24 using any type of communications link. To this extent, the mobile payment application 26 can manage a set of interfaces (e.g., graphical user interface(s), application program interface(s), and/or the like) that enable the customer 12 to interact with the mobile payment application 26. Further, the mobile payment application 26 can manage (e.g., store, retrieve, create, manipulate, organize, present, etc.) data using any solution.

In any event, the mobile device 24 can comprise one or more general purpose computing articles of manufacture (e.g., computing devices) capable of executing program code, such as the mobile payment application 26, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the mobile payment application 26 can be embodied as any combination of system software and/or application software.

Further, the mobile payment application 26 can be implemented using a set of modules 110. In this case, a module 110 can enable the mobile device 24 to perform a set of tasks used by the mobile payment application 26, and can be separately developed and/or implemented apart from other portions of the mobile payment application 26. As used herein, the term "component" means any configuration of hardware, with or without software, which implements the functionality described in conjunction therewith using any solution, while the term "module" means program code that enables a mobile device 24 to implement the actions described in conjunction therewith using any solution. When fixed in a storage component 104 of a mobile device 24 that includes a processing component 102, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of the mobile device 24.

It is understood that the mobile device 24 is merely representative of various possible equivalent computer systems that may perform a process described herein. To this extent, in other embodiments, the functionality provided by the mobile device 24 and the mobile payment application 26 can be at least partially implemented by one or more computing devices that include any combination of general and/or specific purpose hardware with or without program code. In each embodiment, the hardware and program code, if included, can be created using standard engineering and programming techniques, respectively.

While performing a process described herein, the mobile device 24 can communicate with one or more other computer systems using any type of communications link. The communications link can comprise any combination of various types of wired and/or wireless links; comprise any combination of one or more types of networks; and/or utilize any combination of various types of transmission techniques and protocols.

As discussed herein, the mobile payment application 26 enables the mobile device 24 to implement a two phase payment link and authorization method. The mobile device 24 can obtain data used by the mobile payment application 26 using any solution. For example, the mobile device 24 can generate and/or be used to generate data, retrieve/send data from/to one or more data stores, receive/send data from/to another system (e.g., payment cloud 28), and/or the like.

While shown and described herein as a two phase payment link and authorization method and system, it is understood that aspects of the invention further provide various alternative embodiments. For example, in one embodiment, the invention provides a computer program fixed in at least one computer-readable medium, which when executed, enables a mobile device to implement a two phase payment link and authorization process. To this extent, the computer-readable medium includes program code, such as the mobile payment application 26, which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code, such as the mobile payment application 26, which implements some or all of a process described herein. In this case, a computer system can process a copy of program code that implements some or all of a process described herein to generate and transmit, for reception at a second, distinct location (e.g., a mobile device, a computer system, etc.), a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system, a mobile device, etc., receiving the set of data signals described herein, and translating the set of data signals into a copy of the computer program fixed in at least one computer-readable medium. In either case, the set of data signals can be transmitted/received using any type of communications link.

It is understood that aspects of the invention can be implemented as part of a business method that performs a process described herein on a subscription, advertising, and/or fee basis. For example, the service provider can manage (e.g., create, maintain, support, etc.) a computer system and/or mobile device, that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for payment and authorization, comprising:
   requesting and receiving, at a mobile device, a transaction identifier from a payment service;
   displaying the transaction identifier on a display of the mobile device, wherein the transaction identifier is in a machine readable format;
   scanning the transaction identifier at a point of sale system;
   sending the transaction identifier and transaction information associated with items to be purchased from the point of sale system to the payment service;
   creating, at the payment service, a logical link between the mobile device and the point of sale system, based on the transaction identifier;
   sending the transaction information from the payment system to the mobile device; and
   authenticating, at the payment service, an identity of a user of the mobile device, the authenticating including entering and storing identity information of the user at the payment service,
   wherein the authenticating further includes providing the stored identity information of the user after initiating the payment authorization,
   wherein the entering and storing of the identity information is performed prior to the initiating of the payment authorization.

2. The method of claim 1, further comprising:
   displaying the transaction information on the display of the mobile device;
   receiving a payment method selection;
   sending the selected payment method to the payment service;
   completing a payment authorization at the payment service; and
   sending acknowledgment of the payment authorization to the point of sale system.

3. The method of claim 1, wherein the payment system comprises a payment cloud.

4. The method of claim 1, further comprising:
   authenticating an identity of a user of the mobile device.

5. The method of claim 1, wherein the machine readable format comprises a barcode.

6. The method of claim 1, wherein the transaction identifier is unique to a given transaction and is valid for a predetermined period of time.

7. An apparatus for payment and authorization, comprising:
   a component for requesting and receiving, at a mobile device, a transaction identifier from a payment service;
   a display for displaying the transaction identifier on the mobile device, wherein the transaction identifier is in a machine readable format;
   a component for scanning the transaction identifier at a point of sale system;
   a component for sending the transaction identifier and transaction information associated with items to be purchased from the point of sale system to the payment service;
   a component for creating, at the payment service, a logical link between the mobile device and the point of sale system, based on the transaction identifier;
   a component for sending the transaction information from the payment system to the mobile device; and
   a component for authenticating, at the payment service, an identity of a user of the mobile device, the authenticating including entering and storing identity information of the user at the payment service,
   wherein the component for authenticating further provides the stored identity information of the user after initiating the payment authorization,
   wherein the entering and storing of the identity information is performed prior to the initiating of the payment authorization.

8. The apparatus of claim 7, further comprising:
   a display for displaying the transaction information on the display of the mobile device;
   a component for receiving a payment method selection;
   a component for sending the selected payment method to the payment service;
   a component for completing a payment authorization at the payment service; and
   a component for sending acknowledgment of the payment authorization to the point of sale system.

9. The apparatus of claim 7, wherein the payment system comprises a payment cloud.

10. The apparatus of claim 7, further comprising:
    a component for authenticating an identity of a user of the mobile device.

11. The apparatus of claim 7, wherein the machine readable format comprises a barcode.

12. The apparatus of claim 7, wherein the transaction identifier is unique to a given transaction and is valid for a predetermined period of time.

13. A computer program comprising program code embodied in at least one computer-readable storage medium, which when executed, enables a computer system to implement a method for payment and authorization, the method comprising:
- requesting and receiving, at a mobile device, a transaction identifier from a payment service;
- displaying the transaction identifier on a display of the mobile device, wherein the transaction identifier is in a machine readable format;
- scanning the transaction identifier at a point of sale system;
- sending the transaction identifier and transaction information associated with items to be purchased from the point of sale system to the payment service;
- creating, at the payment service, a logical link between the mobile device and the point of sale system, based on the transaction identifier;
- sending the transaction information from the payment system to the mobile device; and
- authenticating, at the payment service, an identity of a user of the mobile device, the authenticating including entering and storing identity information of the user at the payment service,
- wherein the authenticating further includes providing the stored identity information of the user after initiating the payment authorization,
- wherein the entering and storing of the identity information is performed prior to the initiating of the payment authorization.

14. The computer program of claim 13, wherein the method further comprises:
- displaying the transaction information on the display of the mobile device;
- receiving a payment method selection;
- sending the selected payment method to the payment service;
- completing a payment authorization at the payment service; and
- sending acknowledgment of the payment authorization to the point of sale system.

15. The computer program of claim 13, wherein the payment system comprises a payment cloud.

16. The computer program of claim 13, wherein the method further comprises:
- authenticating an identity of a user of the mobile device.

17. The computer program of claim 13, wherein the machine readable format comprises a barcode.

18. The computer program of claim 13, wherein the transaction identifier is unique to a given transaction and is valid for a predetermined period of time.

19. A method of generating a computer system for payment and authorization, the method comprising:
- providing a computer system operable to:
  - request and receive, at a mobile device, a transaction identifier from a payment service;
  - display the transaction identifier on a display of the mobile device, wherein the transaction identifier is in a machine readable format;
  - scan the transaction identifier at a point of sale system;
  - send the transaction identifier and transaction information associated with items to be purchased from the point of sale system to the payment service;
  - create, at the payment service, a logical link between the mobile device and the point of sale system, based on the transaction identifier;
  - send the transaction information from the payment system to the mobile device; and
  - authenticating, at the payment service, an identity of a user of the mobile device, the authenticating including entering and storing identity information of the user at the payment service,
  - wherein the authenticating further includes providing the stored identity information of the user after initiating the payment authorization,
  - wherein the entering and storing of the identity information is performed prior to the initiating of the payment authorization.

* * * * *